March 9, 1937.  E. E. FRANZ  2,073,471
POWER TRANSMISSION DEVICE
Filed Oct. 8, 1935
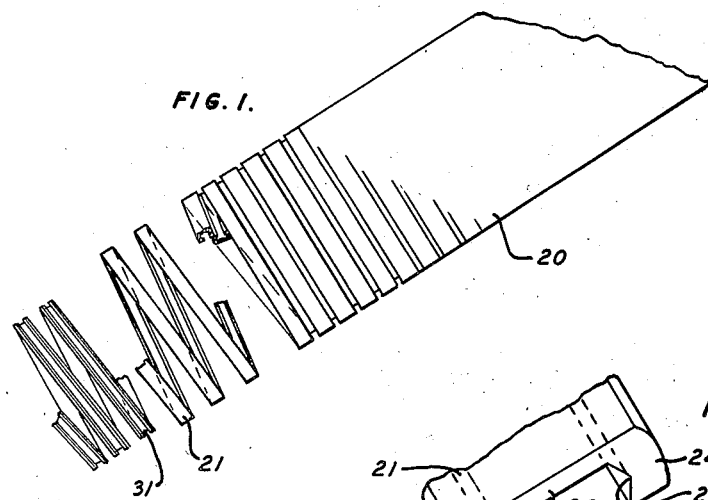
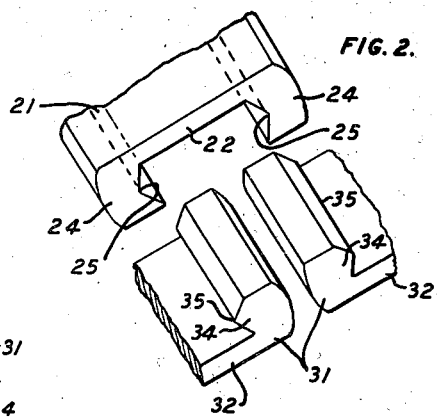
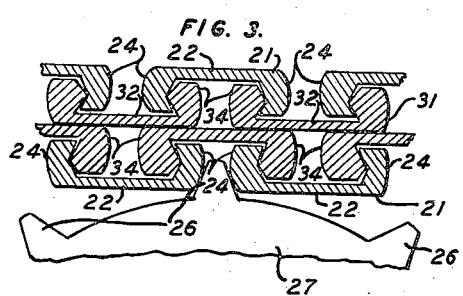
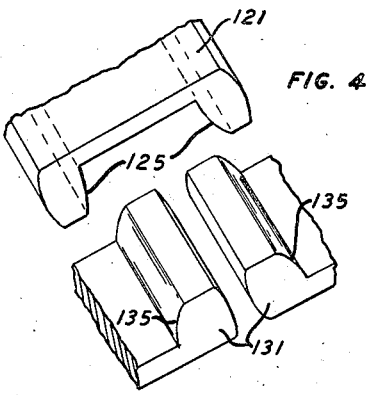
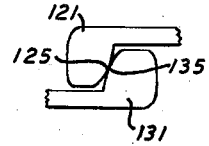
INVENTOR
E. E. FRANZ
BY E.R.Nowlan
ATTORNEY Patented Mar. 9, 1937

2,073,471

UNITED STATES PATENT OFFICE 2,073,471

POWER TRANSMISSION DEVICE

Erwin E. Franz, Cranford, N. J., assignor to Western Electric Company, Incorporated, New York, N. Y., a corporation of New York Application October 8, 1935, Serial No. 44,052

11 Claims. (Cl. 74—245)

This invention relates to a power transmission device and more particularly to a band like element or belt for use with pulleys, toothed sectors, sprocket wheels and the like elements in the transmission of power.

Ordinarily when flexible band like elements running over rotary toothed members are used for power transmission, such elements, structurally speaking, are chains, i. e. are made up of a multiplicity of relatively small links interconnected pivotally by transverse pivots and there is a multiplicity of points at each place where pivoting occurs which are subject to wear.

One object of the present invention is to provide a band like element or belt for power transmission which shall be simple to manufacture and reliable and long lived in service.

One embodiment of the invention comprises a pair of complementary ribbons or bands or elongated elements each having a generally channel shaped cross-section, arranged to interlock laterally, with the turned in edges of each extending into and along the channel of the other, and formed into broadly flattened helices whose turns may be spaced to admit of the entry of sprocket teeth or the like between adjacent coils of the helices, and the inner engaged faces of the edges of the bands being formed to facilitate relative rocking without rubbing.

Other objects and features of the invention will appear from the following detailed description of one embodiment thereof taken in connection with the accompanying drawing in which the same reference numerals are applied to identical parts in the several figures and in which Fig. 1 is a fragmentary view in perspective of a part of a belt constructed in accordance with the invention showing also a portion thereof exploded and spread apart;

Fig. 2 is an enlarged fragmentary view of a portion thereof taken apart;

Fig. 3 is a fragmentary enlarged view in side elevation and partly in section of a portion of the belt engaged with a tooth on a sprocket;

Fig. 4 is a view similar to Fig. 2 of a modified form, and

Fig. 5 is a detail of the form shown in Fig. 4.

In the embodiment of the invention disclosed in Figs. 1, 2, and 3, a belt 20 comprises two interlocking flatly helical channel shaped ribbons, an outer ribbon 21 and an inner ribbon 31. The ribbon 21 is a continuous strip of suitable material, preferably a tough resiliently flexible hard or hardenable metal such as steel, spring brass or the like, the ribbon comprising a floor 22 and integral side walls 24, 24 at right angles to the floor. The side walls 24 have their inner faces preferably angularly grooved as indicated at 25 to engage with a complementarily formed part of the ribbon 31, and the outer faces of the walls 24 are given a form suitable for engagement with and disengagement from the teeth 26 of a sprocket 27.

The ribbon 31 is also channel shaped with a floor 32 and integral side walls 34, 34, the inner faces of the side walls being angularly convex as at 35 for engagement in the angularly concave complementary grooves 25 of the members 24, and the angle at 25 being somewhat wider than the angle at 35 so that the dihedral angle at 35 having its vertex edge engaged in the vertex edge of the dihedral angle at 25 may rock therein to a limited extent.

Ordinarily to make the belt 20 endless each of the strips or ribbons 21 and 31 may have its two ends secured together by any appropriate means, preferably by welding, brazing or soldering, thus making each of the two ribbons endless in itself also, although this is not necessary.

The modified form shown in Figs. 4 and 5 is substantially like that described above having the outer channel shaped helix 121 interengaged in the same way with the inner channel shaped helix 131. But in this form the two helices are identically alike in cross-sectional form, the engaging surfaces of their side walls being both convex in form as shown exploded in Fig. 4 and engaged in Fig. 5 and indicated at the numerals 125 and 135.

Although the preferred forms, as described, of the invention are intended for use with toothed complementary elements such as sprockets, it is evident that a belt of the construction disclosed may also be used with toothless pulleys, capstans and the like.

The embodiments of the invention herein disclosed are illustrative only and may be widely departed from in many ways without departing from the spirit and scope of the invention as pointed out in and limited only by the appended claims.

What is claimed is:

1. A belt for power transmission consisting of a pair of complementary, elongated, helically wound elements each having a channel shaped cross-section and each having the edges thereof disposed between and engaged with the edges of the other.

2. A belt for power transmission consisting of a pair of longitudinally channelled ribbon like members associated together with the edges of each positioned within the channel of the other.

3. A belt for power transmission comprising an elongated, flat, longitudinally channelled member formed into a helix with the coils thereof flattened transversely to the axis thereof and with the channelled face on the inside of the coils, in combination with a second elongated, flat, longitudinally channelled member formed into a helix with the coils thereof flattened transversely to the axis thereof and with the channelled face on the outside of the coils thereof.

4. A belt for power transmission comprising an elongated, flat, longitudinally channelled member formed into a helix with the coils thereof flattened transversely to the axis thereof and with the channelled face on the inside of the coils, in combination with a second elongated, flat, longitudinally channelled member formed into a helix with the coils thereof flattened transversely to the axis thereof and with the channelled face on the outside of the coils thereof, the edges of each member being positioned within the channel of the other member.

5. A belt for power transmission consisting of a pair of complementary, elongated, helically wound elements each having a channel shaped cross-section and each having the edges thereof disposed between and engaged with the edges of the other, the coils of each element being spaced apart from each other and bridging the space between adjacent coils of the other element.

6. A belt for power transmission comprising an elongated, flat, longitudinally channelled member formed into a helix with the coils thereof flattened transversely to the axis thereof and with the channelled face on the inside of the coils, in combination with a second elongated, flat, longitudinally channelled member formed into a helix with the coils thereof flattened transversely to the axis thereof and with the channelled face on the outside of the coils thereof, the edges of each member being positioned within the channel of the other member, and the coils of each element being spaced apart from each other and bridging the space between adjacent coils of the other element.

7. A belt for power transmission consisting of a pair of complementary, helically wound, mutually interlocked elements.

8. A belt for power transmission consisting of a pair of complementary, elongated, helically wound elements each having a channel shaped cross-section and each having the edges thereof disposed between and engaged with the edges of the other, the engaging portions being formed with respectively concave and convex cross-sections.

9. A belt for power transmission comprising an elongated, flat, longitudinally channelled member formed into a helix with the coils thereof flattened transversely to the axis thereof and with the channelled face on the inside of the coils, in combination with a second elongated, flat, longitudinally channelled member formed into a helix with the coils thereof flattened transversely to the axis thereof and with the channelled face on the outside of the coils thereof, the edges of each member being positioned within the channel of the other member, the engaging portions being formed with respectively concave and convex cross-sections.

10. A belt for power transmission consisting of a pair of complementary, elongated, helically wound elements each having a channel shaped cross-section and each having the edges thereof disposed between and engaged with the edges of the other, the engaging portions being formed with respectively concave and convex cross-sections of dihedral form.

11. A belt for power transmission comprising an elongated, flat, longitudinally channelled member formed into a helix with the coils thereof flattened transversely to the axis thereof and with the channelled face on the inside of the coils, in combination with a second elongated, flat, longitudinally channelled member formed into a helix with the coils thereof flattened transversely to the axis thereof and with the channelled face on the outside of the coils thereof, the edges of each member being positioned within the channel of the other member, the engaging portions being formed with respectively concave and convex cross-sections of dihedral form.

ERWIN E. FRANZ.